July 26, 1938.  C. HOLLERITH  2,124,949
BRAKE MECHANISM
Filed March 17, 1934  3 Sheets-Sheet 1
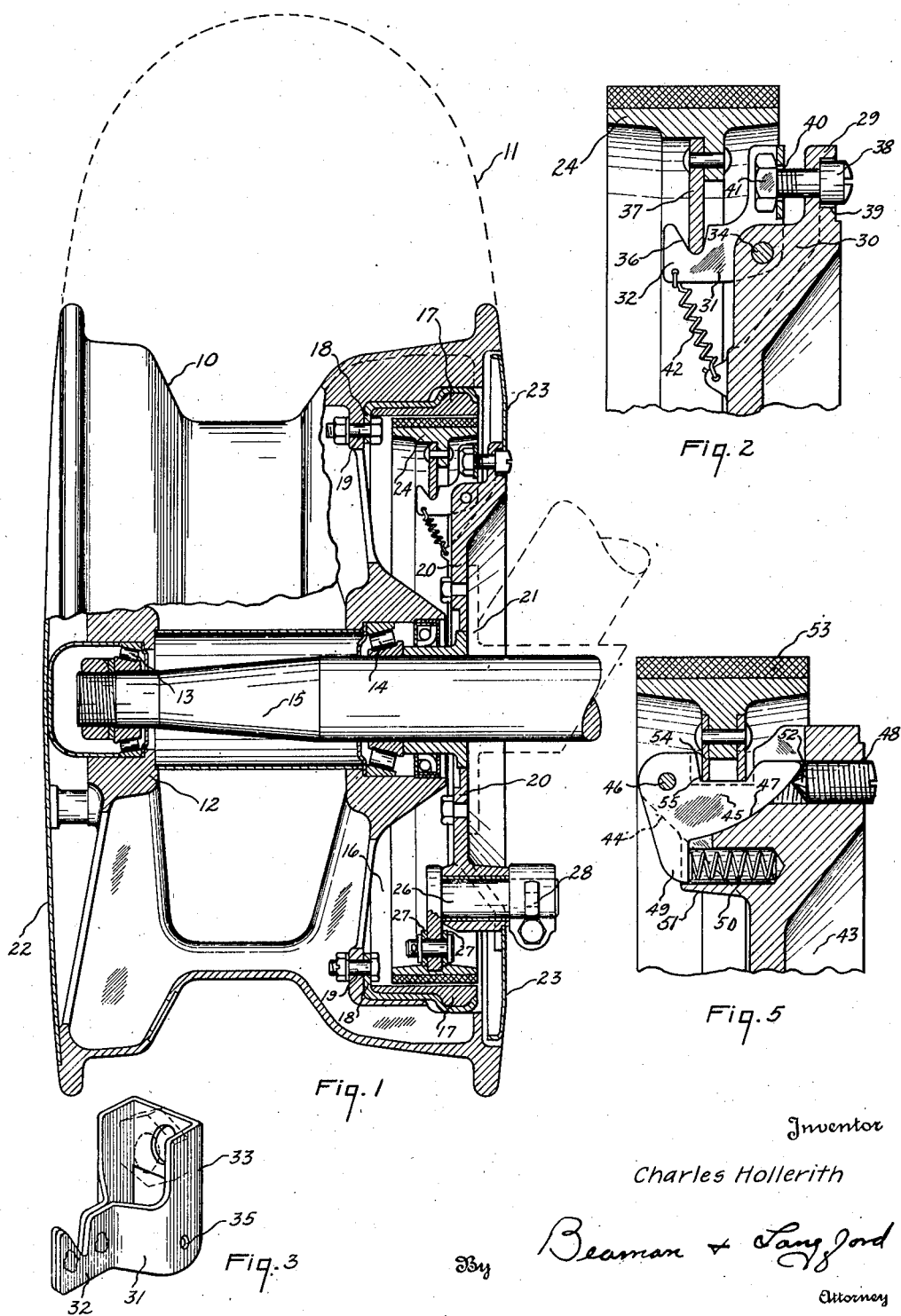
Inventor
Charles Hollerith
By Beaman & Langford
Attorney July 26, 1938.  C. HOLLERITH  2,124,949

BRAKE MECHANISM

Filed March 17, 1934  3 Sheets-Sheet 2

Inventor
Charles Hollerith
By Beaman & Langford
Attorney

July 26, 1938.    C. HOLLERITH    2,124,949
BRAKE MECHANISM
Filed March 17, 1934    3 Sheets-Sheet 3
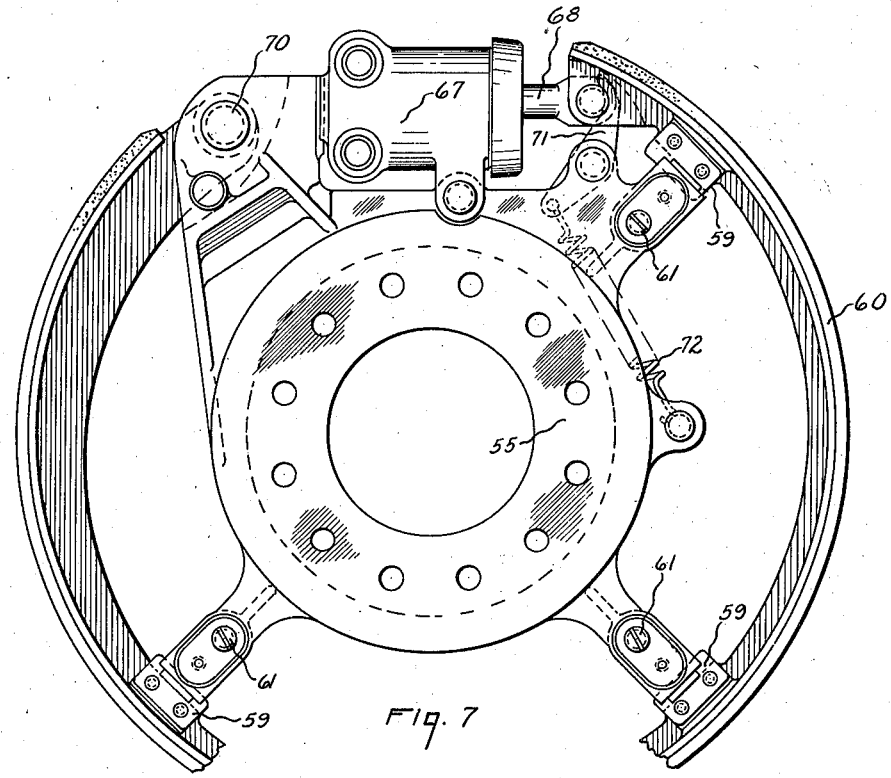
Fig. 7
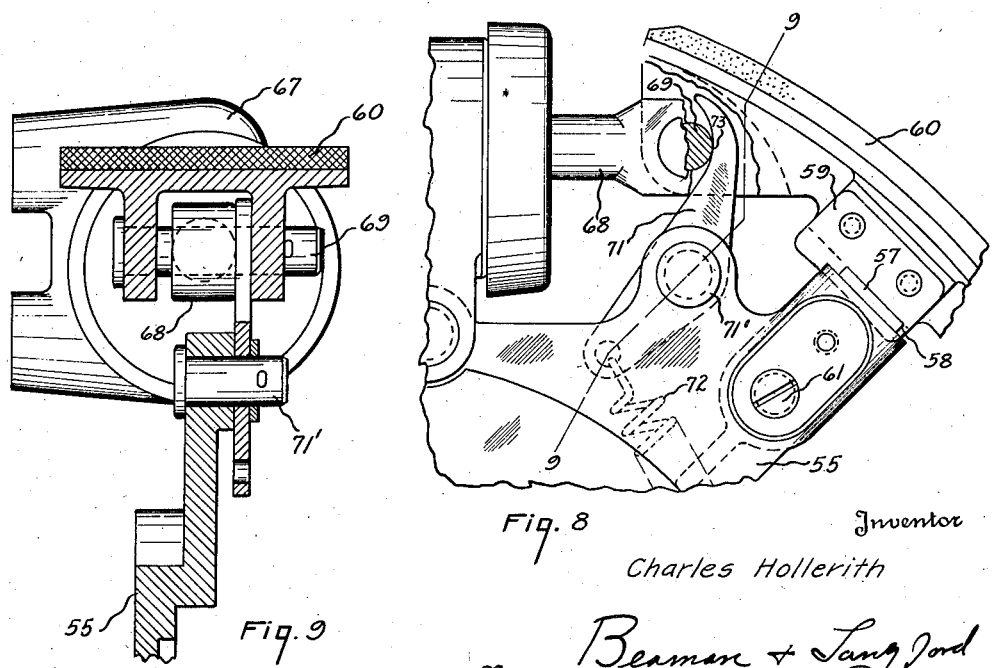
Fig. 8
Fig. 9
Inventor
Charles Hollerith
By Beaman & Langford
Attorney Patented July 26, 1938

2,124,949

UNITED STATES PATENT OFFICE 2,124,949

BRAKE MECHANISM

Charles Hollerith, Jackson, Mich., assignor to Hayes Industries, Inc., Jackson, Mich., a corporation of Michigan Application March 17, 1934, Serial No. 716,066

7 Claims. (Cl. 188—79.5)

The present invention relates to improvements in brake mechanisms and is illustrated as embodied in internal expanding brakes of the servo type. Although the invention is particularly adaptable to brake constructions for airplane landing gear wheels, it has general application.

An important feature of the invention resides in a convenient and effective form of adjustment mechanism for the brake band or shoe. This mechanism is characterized by being operable from the outside of the wheel and/or brake assembly obviating the employment of special tools and the inconvenience and excessive time required to effect an adjustment operable only from within the brake assembly. At the same time, although exteriorly situated in part, the adjustment is particularly adapted for streamlining, giving an exceptional cleanliness of exterior appearance especially in airplane land gear wheels wherein it may be substantially flush with the fairing and eliminates the necessity of providing openings therein to give access to the adjustment of the brake as has been the practice heretofore.

Another feature of the invention resides in an improved structure for centering the brake band or shoe and providing the proper clearance between the brake band or shoe and drum with the braking mechanism inoperative.

A further feature of the invention resides in novel means for retracting the brake band or shoe.

Other features and advantages of the invention reside in the combination and arrangement and combination of parts as will be more fully set forth in the detailed description to follow. The invention is clearly defined in the appended claims.

Figure 4:
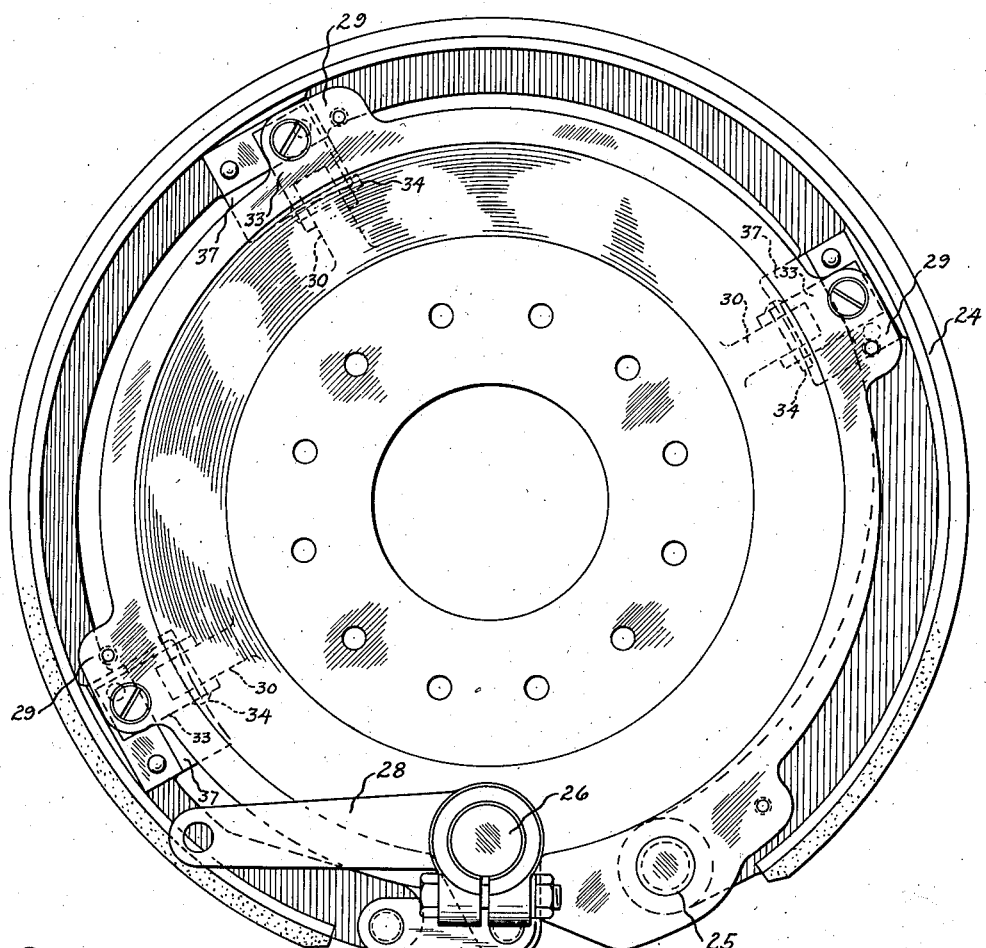
Figures 6, 6A:
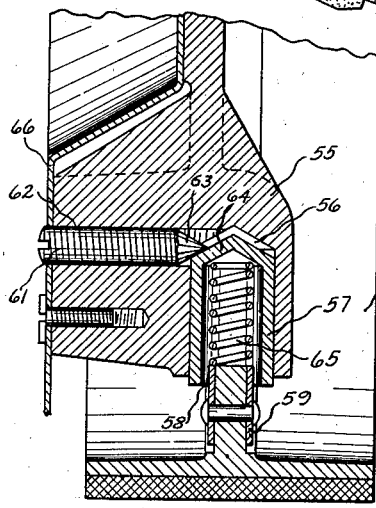
Figure 3A:
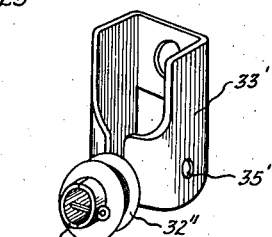

In the several embodiments illustrated in the accompanying drawings,

Fig. 1 is an elevation of a streamline airplane wheel embodying the present invention, certain parts being shown in section, Fig. 2 is an enlarged view of the adjustment mechanism shown in section in Fig. 1, Fig. 3 is a perspective view of a detail of construction of the adjustment mechanism, Fig. 3a is a modification of the mechanism shown in Fig. 3, Fig. 4 is an end view of the brake anchor plate with the brake band attached, Fig. 5 is a modified type of adjustment mechanism, Fig. 6 is a still further modified type of adjustment mechanism, Fig. 6a is a cross-sectional view of the adjustment stop removed from the assembly shown in Fig. 6, Fig. 7 is a view similar to Fig. 4 of the invention applied to a hydraulic brake, Fig. 8 is an enlarged view of certain details of construction shown in Fig. 7, and Fig. 9 is a cross sectional view taken on the line 9—9 of Fig. 8.

Having reference to the drawings, in Fig. 1 the invention is shown in connection with the landing gear of an airplane. The wheel 10 is of "streamline" construction with the pneumatic tire indicated by dotted line representation as at 11. The hub 12 of the wheel is rotatably supported through anti-friction bearings 13—14 upon a stub axle 15. Within the recess 16 provided at the inside of the wheel is housed a brake drum 17 having a turned flange 18 which is bolted or otherwise secured to the wheel structure as at 19. A brake anchor or backing plate 20 is bolted to the usual torque flange 21 shown in dotted line representation. Fairings 22 and 23 carried by the wheel 10 and anchor plate 20, respectively, complete the streamline of the wheel and brake assembly. The fairing 23 which is of annular shape is preferably removably secured to the backing plate 20 by some suitable means (not shown) to permit inspection of the brake mechanism without removal of the wheel.

The brake mechanism selected for the illustration of the invention is of the self energizing or servo type comprising a brake band 24 having one end fixed upon a pivot 25 located in the anchor or backing plate. A rock shaft 26 is connected through links 27 to the opposite end of the band 24 and upon actuating of the shaft by the external brake operating lever 28 the band 24 is expanded within the drum 17 and is "wrapped" upon the same in a well known manner.

For providing proper clearance, compensating for wearing of the band 24, and to center and guide the band 24 during brake application, the following novel mechanism is provided. Ears 29 are provided at spaced points upon the periphery of the plate 20. In radial alignment with these ears are provided projections 30 as shown best in Figs. 2 and 4. Pivoted upon each of said projections 30 is a bell crank lever 31 which may be conveniently formed from a sheet metal blank into a two-ply horizontal arm 32 and a vertical shell 33. This shell straddles the projection 30 and is pivoted upon a pin 34 passed through an aperture in the projection and journaled in aperture 35 located on opposite sides of the shell 33. A groove 36 is provided in the arm 32 forming a seat for a guide plate 37 attached to the brake band 24 in approximately a plane through the axis of the pin 34 normal to a radial plane. A cap screw 38 is countersunk in the ears 29 as at 39 and extends through an aperture 40 in the shell 33 where it engages a hexagon nut 41 held against rotation by the sides of the shell. To prevent the screw 38 working loose, the nut 41 is preferably of the elastic stop type in which sufficient resistance is offered to the threading of the cap screw into the nut to prevent rotation due to vibration and the like. Obviously, other ways of preventing relative rotation between the screw and nut may be employed within the scope of the invention. To prevent rattle between the associated parts, a spring 42 is provided which continuously urges the lever 31 counterclockwise.

Referring to Fig. 4 it will be seen that the guide plates 37 and associated parts, as shown in Fig. 2, are substantially equally spaced about the periphery of the plate 20 with reference to the pivot 25. Upon actuation of the lever 28 clockwise, as viewed in Fig. 4, to apply the brake, the free end of the brake band 24 is moved in a circumferential direction about the pivot 25. During this movement of the brake band, the guide plates 37 traverse the grooves 36 to varying degrees depending upon their relative position with reference to the fixed end of the brake band. This arrangement results in the brake band being centered and guided throughout its entire length while in an operative position and during application. As a refinement of construction, the edges of the guide plates 37, seated within the groove 36, may have the curvature of an arc having the same center as the brake band to avoid any tendency of the brake band to be cammed outwardly by the guiding action of the arms 32. Upon brake release the brake band will be guided back and centered by the plate 37 and coacting grooves 36 under the urge of suitable spring means (not shown) in a well-known manner. With the brake band in the inoperative position, the arms 32 constitute limiting stops providing the proper clearance between the band and the brake drum. Through manipulation of the screws 38 the clearance may be varied and adjustment made to commensurate for the wearing of the brake lining. As heretofore stated, the seats for the guide plates 37 in the arms 32 are located in planes through the axis of the pins 34 normal to radial planes. As a result of their arrangement the slight movement of the arms 32 about the axis of the pin 34 necessary for maximum take up of the band renders lateral movement of the brake band due to such adjustment negligible.

In Fig. 3a is shown a modification of the construction shown in Fig. 3. The sheet metal blank is formed into a shaft 32' and a shell 33'. A V-grooved roller 32'' is supported for rotation upon the shaft 32'. Apertures 35' are provided to receive pin 34 as heretofore described. The employment of the roller 32'' in lieu of the slotted arm 32 in which to receive the guide plate 37 may be preferred to reduce friction.

From the foregoing description it should appear that I have provided an effective adjustment for the brake band or shoe which assures proper clearance and guidance. The necessary adjustment may be readily made by rotating the screws 38 which are located upon the periphery of the backing plate giving maximum spacing from the wheel axle with the resulting improved accessibility. It is apparent from inspection that the adjustment, although located upon the outside of the backing plate, permits improved streamlining over prior structures.

In Fig. 5 is illustrated a modification of the adjustment shown in Fig. 2 which is slightly more compact. The brake backing or anchoring plate 43 is cast with spaced projections 44 between which is pivotally supported an adjustment member 45 upon a pin 46. One face of the member 45 is curvilinear as at 47 and is adapted to traverse the path of the adjustment screw 48 operating in a threaded aperture in the backing plate. An abutment 49 upon the member 45 constitutes a seat for a spring 50 in a well 51. This spring urges the member 45 clockwise into stressed anti-rattle engagement with the conical nose 52 of the screw 48 which may be provided with flats to prevent loosening of the screw. The brake band 53 is provided with a guide plate 54 which is seated in a groove 55 which bears the same relation to the axis of the pin as the grooves 36 do to the axis of the pin 34 as heretofore described. Similar functions are performed by the guide plate 54 and grooves 55 as was described with reference to the guide plates 37 and grooves 36 shown in Fig. 2. Upon adjustment of the screw 48 inwardly the member 45 will be cammed about its pivot counterclockwise to vary the clearance between the brake band and drum.

A further modification is shown in Figs. 6 and 6a of the adjustment mechanism from the brake band. This arrangement is exceedingly simple in its construction but does not permit the adjustment screw to be located as adjacent the periphery of the brake band as those previously considered. As illustrated, the backing or anchoring plate 55 is provided with a cylindrical chamber 56 within which is received for radial adjustment a hollow piston-like guiding stop 57. This stop is slotted as at 58 to receive the guide plates 59 of the brake band 60. An adjustment screw 61 is threaded in an aperture 62 preferably normal to the chamber 58. This screw is illustrated as having a conical end provided with a series of flats 63 which contact with the conical end 64 of the stop 57. A loose compression spring 65 is located within the stop 57 and abuts against the guide 59 and the conical end 64 to continuously urge the stop 57 into engagement with the end of the adjustment screw. Because of the flats upon the screw 61 vibration will not loosen the screw. It is to be understood that the spring 65 is not of sufficient strength to urge the brake band into engagement with the brake drum but is merely strong enough to prevent rattling of the parts and rotation of the adjustment screw 61 by vibration. Upon rotation of the adjustment screw the stop 57 will be cammed radially outward to provide the proper clearance between the brake band and drum compensating for any wear. To prevent possible dislodgement of the guide plate 59 from the slot 58 as the brake band wears, the depth of the slot is slightly greater than the thickness of the brake lining upon the band. Thus, upon application of the brake, even with the lining substantially worn away and the stops 57 out of proper adjustment the guide plate 59 will be confined within the slot 58. As illustrated, the adjustment screw is accessible from the inner side of the wheel and brake assembly through the fairing 66.

In Figs. 7 and 8, the adjustment shown in Fig. 6 is shown in combination with a hydraulic brake actuating mechanism having a novel means for returning to and retaining the brake band in a retracted position; the aforesaid means coacting with the novel adjustment mechanism so as to avoid the placing of any objectionable restriction or defining the course of the brake band in the plane of application during the "wrapping" of the brake band about the inside of the brake drum.

Referring to Fig. 7 in particular, a fluid motor 67 of well known construction is supported upon the backing plate 55 and includes a piston rod 68 connected by a pin 69 to the brake band 60. As will be well understood, movement of the piston 68 to the right, as viewed in Fig. 7, will result in the brake band being circumferentially moved about the pivot 70 bringing the same into engagement with the brake drum to effect brake application. For retracting the brake band 60 a finger-like member 71 is provided which engages the pin 69 at one end and is pivoted upon the backing plate 55 as at 71'. The opposite end of the member 71 is connected to a spring 72 which continuously urges the end of the member engaging the pin 69 counterclockwise. As shown in Fig. 8, the face 73 of the member 71 is of such curvilinearity as to permit the pin 69 to slide along the same upon movement of the piston rod to the right thus obviating any tendency to define the course of movement of the brake band. With this arrangement the brake band, during the braking operation, is substantially free to float in the plane of application. It is to be understood that in retracting the brake band, the finger 71 will also act to hold the free end of the band inwardly from the brake drum. Also, as a departure from prior practice of locating the brake band retracting springs forward of the free end thereof, in certain constructions mechanical difficulties may be overcome by the ability to locate the spring 72 in the manner shown.

It is fully appreciated that the novel adjustment mechanisms herein disclosed have broad application in the adjustment of various types of brake bands and shoes. For this reason I do not choose to be limited to the type of brake band disclosed by way of illustration. Moreover, although the invention as heretofore stated is particularly adaptable to brake mechanisms upon airplane landing gears, it is in no sense limited to brake mechanisms used upon any particular type of structure.

Having described my invention, what I claim as new and desire to protect by Letters Patent is:

1. In a brake mechanism, the combination with a braking member having a guide portion, of a brake drum, means for expanding and retracting said member within said drum, a backing plate, an adjustable guiding stop for regulating the clearance between said drum and member with the latter in a retracted position, said stop being pivoted upon the inside of said plate for movement in a radial plane and having a channel portion as a unitary part thereof constituting a seat for said guide portion for guiding and centering said braking member, and means extending through said backing plate and manipulated from the the outside thereof engaging said stop to rock the same upon its pivot to vary the adjustment.

2. In a brake mechanism, the combination with a braking member, of a brake drum, a backing plate, an adjustable guiding stop for regulating the clearance between said member and brake drum supported in said plate for radial movement, said stop having a slotted outer end as a unitary part thereof in which a portion of said member is received to center and position the member, adjustment means extending through and manipulated from the outside of said backing plate engaging said stop to cam the same radially outward, and means for constantly urging said stop into contact with said adjustment means.

3. In a brake mechanism, the combination with a brake member, a brake drum, means for urging said member into and out of engagement with said drum, an adjustment stop for regulating the clearance between said drum and member with the latter in a retracted position, a rotatable adjustment screw engaging with said stop to vary its position of adjustment, that part of said adjustment screw engaging with said stop being provided with a series of flats resisting the rotation of said screw from one position to another.

4. In a brake mechanism, the combination with a brake member, a brake drum, means for urging said member into and out of engagement with said drum, an adjustment stop supported for radial movement for regulating the clearance between said drum and member with the latter in a retracted position, a slot defined in said stop to receive a portion of said brake member in supporting and guiding relation, an adjustment screw having a tapered end, a nose portion upon said stop with which the tapered end of said screw is adapted to engage to impart movement to said stop, a spring, and means upon said stop against which said spring acts.

5. In a brake mechanism, the combination with a brake member, a brake drum, means for urging said member into and out of engagement with said drum, an adjustment stop, a pivotal mounting for the adjustment stop supporting the same for pivotal movement in a radial plane, said stop being generally L-shaped, a tongue and groove connection between said brake member and one leg of said stop, and an adjustment member having inner and outer ends with the outer end accessible for manual manipulation and with the inner end coacting with the other leg of said stop.

6. In a brake mechanism, the combination set forth in claim 5 wherein the pivotal support for said stop is located radially inward from the point of engagement between the inner end of said adjustment member and said stop.

7. In a brake mechanism, the combination with a brake member, a brake drum, means for urging said member into and out of engagement with said drum, an adjustment stop, means supporting said adjustment stop for pivotal movement in a radial plane, tongue and groove connections between said adjustment stop and said brake member, an adjustment member having inner and outer ends with the outer end accessible for manual manipulation and with the inner end coacting with said adjustment stop, said pivotal connection and the point of engagement with said inner end of said adjustment member with said stop being located upon opposite sides of said tongue and groove connections.

CHARLES HOLLERITH.